United States Patent
Littau et al.

(10) Patent No.: US 8,156,725 B2
(45) Date of Patent: Apr. 17, 2012

(54) $CO_2$ CAPTURE DURING COMPRESSED AIR ENERGY STORAGE

(75) Inventors: Karl A. Littau, Palo Alto, CA (US); Raphael Stumpp, Gaienhofen (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1151 days.

(21) Appl. No.: 11/962,959

(22) Filed: Dec. 21, 2007

(65) Prior Publication Data

US 2009/0158740 A1 Jun. 25, 2009

(51) Int. Cl.
*F02C 7/08* (2006.01)
(52) U.S. Cl. ............... 60/39.5; 60/727; 60/764
(58) Field of Classification Search .............. 60/727, 60/784, 785, 659, 39.5
See application file for complete search history.

(56) References Cited

U.S. PATENT DOCUMENTS

| | | | | |
|---|---|---|---|---|
| 2,617,484 A * | 11/1952 | Swearingen | ............. | 166/52 |
| 4,052,176 A * | 10/1977 | Child et al. | ............. | 95/161 |
| 4,765,142 A * | 8/1988 | Nakhamkin | ............. | 60/652 |
| 5,467,722 A * | 11/1995 | Meratla | ............. | 110/345 |
| 6,153,943 A * | 11/2000 | Mistr, Jr. | ............. | 290/52 |
| 6,655,150 B1 * | 12/2003 | Åsen et al. | ............. | 60/772 |
| 7,895,822 B2 * | 3/2011 | Hoffmann et al. | ............. | 60/39.5 |
| 2006/0260312 A1 | 11/2006 | Ingersoll | | |

* cited by examiner

*Primary Examiner* — William H Rodriguez
*Assistant Examiner* — Carlos A Rivera
(74) *Attorney, Agent, or Firm* — Oliff & Berridge, PLC

(57) ABSTRACT

A compressed air energy storage system and method of capturing $CO_2$ during compressed air energy storage the system and method including a gas inlet pipe, at least one air compressor stage attached to the gas inlet pipe and adapted for compression of a gas, a heat transfer system to cool the gas during or after compression, the heat being recycled throughout the system, at least one absorption bed for separating $CO_2$ from the compressed gas attached to the heat transfer system, at least one compressed gas reservoir having an inlet and an outlet, the reservoir attached at its inlet to the absorption bed, at least one preheater stage attached to the outlet of the compressed gas reservoir for heating a compressed gas after storage in the compressed gas reservoir, and at least one gas expander attached to the preheater stage and adapted for the expansion of the compressed gas.

19 Claims, 4 Drawing Sheets

CO₂ CAPTURE DURING COMPRESSED AIR ENERGY STORAGE

TECHNICAL FIELD

The present disclosure relates to a system and method for the capture of $CO_2$ from a mixed gas stream on an industrial scale. The present disclosure is more particularly related to a compressed air energy storage (CAES) system having one or more of a pressure swing absorption bed, a temperature swing absorption bed or a pressure-temperature swing absorption bed for removing $CO_2$ from a mixed gas stream.

BACKGROUND

In recent years, there has been increasing discussion concerning the effect of greenhouse gases on the Earth's atmosphere. An increase in greenhouse gases can lead to climate changes, also known as the "greenhouse effect," and these changes are primarily caused by the increase of the carbon dioxide concentration in the atmosphere. The burning of fossil fuels, such as natural gas, mineral oil and coal, is the primary cause of this increase in carbon dioxide concentration. Most greenhouse gases, including carbon dioxide, take a long time to leave the atmosphere. Therefore, there is an increased interest in developing processes that can remove carbon dioxide and other greenhouse gases from the atmosphere on an industrial scale. For example, carbon dioxide can be removed from the flue gases of fossil fuel-fired power plants or from the exhaust gases of gas turbine power plants before they are released into the atmosphere.

Carbon dioxide is generally separated using a $CO_2$ capture system such as an absorption bed. Other techniques currently being investigated include pressure swing adsorption, temperature swing adsorption, gas separation membranes and cryogenics. Absorption is a process that occurs when a gas or liquid solute is taken up by the volume of a solid, liquid, or gas called an absorbent. Pressure swing absorption relies on the principle that under pressure, gases tend to be transferred to the volume, or absorbed. The higher the pressure, the more gas is absorbed. When the pressure is reduced, the gas is released, or desorbed. Temperature swing absorption relies on the principle that at low temperatures gases tend to be absorbed and at higher temperatures, gases tend to be desorbed. Pressure-temperature swing absorption combines both temperature and pressure variations to maximize absorption of gases into the absorbent and to minimize the time required for desorption of the gases from the absorbent.

The absorption process is generally run in multi-bed systems so that when some absorption beds are operating in the absorption step, the other beds are being regenerated in the desorption step. Current absorption technology used for separating $CO_2$ from gas mixtures typically consumes about 10 to about 100 times the theoretical minimum energy required for the separation. This energy is consumed during pressurization or heating of the gas stream or absorbent material.

CAES systems are used to efficiently capture electrical energy during hours of off-peak energy consumption using pressure and temperature swings. In a CAES system, one or more electrically activated compressors uses electricity during off-peak energy consumption periods to compress gas that is then stored as potential energy. The process of compressing the gas releases heat and can cause the gas stream to reach temperatures ranging from about 300° C. to about 500° C. The gas stream is usually cooled after the compression process using a heat transfer system. To increase the efficiency of the CAES system, it is known that a heat accumulator may be used to capture heat from the compressed gas stream and to store it in a medium, such as stone, so that it can be used to reheat the compressed gas stream during expansion.

The compressed gas is then stored in a CAES reservoir, usually an underground cavern or other underground geologic formation, until it is used to produce electricity during periods of peak energy consumption. The compressed gas is converted back to electricity by expanding it through a turbine. The process of expansion significantly cools the gas stream, which can damage or freeze the expansion turbine. To counteract the temperature drop of the gas stream during expansion, the compressed gas stream is often preheated through the combustion of fuel. It is also known that the compressed gas stream can be preheated by passing it, in the opposite direction, through the heat transfer system that is used to cool the gas stream during compression.

Currently, there are two CAES systems that have been constructed and are in operation. The first, built in 1977, is in Germany and has a storage capacity of 300,000 m³ and can generate 290 MW of electricity for two hours. The second, built in 1991, is in Alabama and has a storage capacity of 540,000 m³ and can generate 110 MW of electricity over a period of 26 hours. Another CAES plant is being planned in Ohio that will use an abandoned limestone cavern with a storage capacity of approximately 10 million cubic meters with an operating pressure of about 50-100 atm.

U.S. Patent Application Publication No. 20060260312 A1 to Ingersoll discloses a method of creating liquid gas using a wind energy system that has a plurality of direct compression wind turbine stations. In Ingersoll, wind energy is collected and stored as compressed air and liquid gas. The purpose of the Ingersoll disclosure is to more reliably and cost effectively deliver power from existing and proposed offshore wind energy plants.

A need exists, for example, to provide improved methods of removing $CO_2$ and other greenhouse gases from power plant flue gases and other mixed gas streams. There is a further need for improving the efficiency of $CO_2$ removal by combining absorption with existing industrial processes having similar gas handling and temperature and pressure cycling behaviors.

SUMMARY

Accordingly, it is an object of the present disclosure to provide an improved system for removing $CO_2$ from a mixed gas stream. Another object of the present disclosure is to provide an improved method for removing $CO_2$ from mixed gas streams, such as the flue gases of fossil fuel-fired power plants and the exhaust gases of gas turbine power plants. Greenhouse gases, including carbon dioxide, stay in the atmosphere for a long time. Therefore, it is a further object of the present disclosure to provide an improved system for removing carbon dioxide and other greenhouse gases from mixed gas streams on an industrial scale. It is another object of the present disclosure to increase the efficiency and cost-effectiveness of the $CO_2$ capture process by coupling it with a CAES system and by recycling energy throughout the system.

To achieve the foregoing and other objectives and in accordance with the purpose of the present disclosure, a CAES system combined with a $CO_2$ capture system is provided. The present disclosure will utilize the pressure and temperature swings inherent to the CAES system to increase the efficiency of the capture process. The present disclosure will also describe how heat and energy can be recycled throughout the combined system to further increase efficiency.

In accordance with one embodiment of the disclosure there is provided a CAES system comprising a gas inlet pipe; at least one air compressor stage attached to the gas inlet pipe and adapted for compression of a gas; a heat transfer system to cool the gas during or after compression; at least one absorption bed attached to the heat transfer system; at least one compressed gas reservoir having an inlet and an outlet, the compressed gas reservoir being attached at its inlet to the absorption bed; at least one preheater stage that is attached to the outlet of the compressed gas reservoir for heating a compressed gas before expansion but after storage in the compressed gas reservoir; and at least one gas expander that is attached to the preheater stage and is adapted for the expansion of the compressed gas.

There is also provided a method of capturing $CO_2$ during compressed air energy storage, comprising, compressing a gas in at least one compression stage; cooling a compressed gas during or after the at least one compression stage; separating $CO_2$ from the compressed gas using an absorption bed; storing the compressed gas in a compressed gas reservoir; expanding the compressed gas while deriving work from the gas; preheating the compressed gas prior to expansion by feeding the compressed gas through at least one heat exchanger; and recycling the heat generated during compression throughout the system.

Some of the benefits and advantages of the present disclosure are an increase in the efficiency and cost effectiveness of removing $CO_2$ from a mixed gas stream on an industrial scale. By utilizing the gas handling and temperature and pressure cycling behaviors of the CAES system, the energy requirement for the capture process can be greatly reduced. When a $CO_2$ capture system is coupled with a CAES system, the heat that is released during the compression of the gas stream can be captured and recycled to further reduce the energy required to operate the capture process.

Another benefit is that the combined system may be operated during times of both peak and off-peak energy consumption. CAES systems are generally used to store compressed gas during times of off-peak energy consumption. However, when the CAES system is coupled with a capture system, the increase in efficiency of the capture process makes it cost effective to operate the combined system during times of peak energy consumption as well.

A further benefit is that the $CO_2$ that is removed during the capture process can be sequestered or utilized. The sequestered $CO_2$ can be placed in a storage reservoir or it can be further processed. Carbon dioxide is used as a compressed gas by a variety of industries, including food, oil and chemical industries. Carbon dioxide can be converted into a liquid or solid and used as a refrigerant. The sequestered $CO_2$ can also be converted into a hydrocarbon and used as a fuel.

Other aspects and advantages of the disclosure will become apparent from the following description, taken in conjunction with the accompanying drawings, illustrating by way of example the principles of the disclosure.

EMBODIMENTS

A CAES system combined with a $CO_2$ capture system according to the present disclosure will be described with reference to the drawings.

Figure 1:
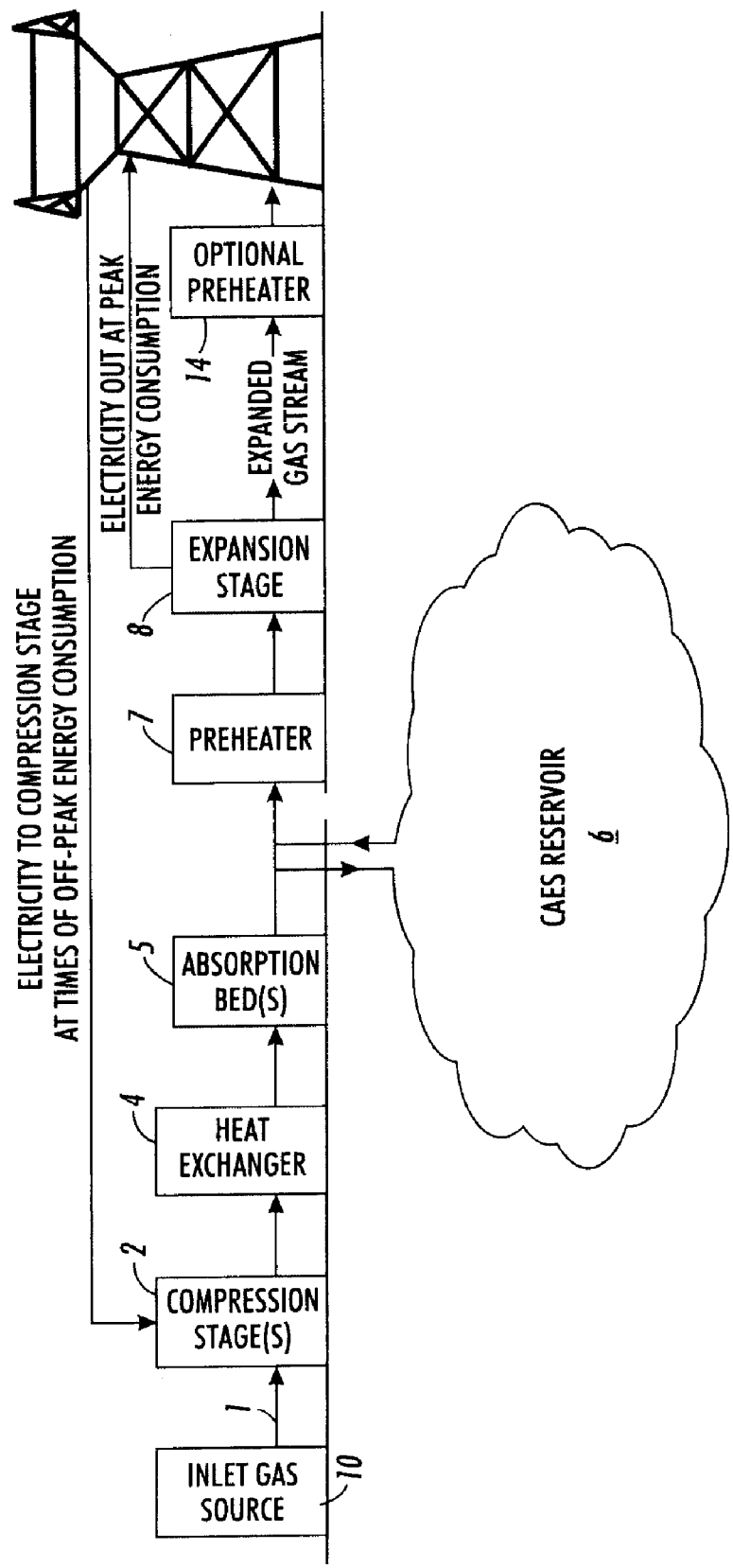
FIG. 1 is a schematic diagram illustrating a CAES system combined with a $CO_2$ capture system.

FIG. 1 shows a schematic diagram of an embodiment of the present disclosure where the gas inlet 1 comes from a gas inlet source 10 that provides a mixed gas stream that contains carbon dioxide and/or other greenhouse gases. Examples of gas inlet sources include fossil fuel-fired power plants, gas turbine power plants and ambient air. If the volume of gas from a power plant exhaust is not sufficient to supply all the fluid volume required to operate a CAES system, then ambient air may be used to provide the balance of gas. Electricity is used to run the compressors as the gas inlet 1 is fed through one or more compression stages 2. The compressed gas stream then enters a heat exchanger 4 where excess heat is removed.

Once the compressed gas stream moves through the heat exchanger 4, it is fed through one or more absorption beds 5 for the removal of $CO_2$. At times of off-peak energy consumption, the compressed gas stream is passed into the compressed gas reservoir 6 where it is stored at a pressure of from about 1000 psi to about 1500 psi until it is needed to produce energy. When the compressed gas stream is needed, it is released from the compressed gas reservoir 6. If the combined CAES system is being run during times of peak energy consumption, the compressed gas stream may bypass the compressed gas reservoir 6 and join the compressed gas stream that is being released from the compressed gas reservoir 6. The compressed gas stream is then preheated in one or more preheater stages 7. Preheating the compressed gas stream before it enters the gas expander 8 prevents the compressed gas from freezing or damaging the turbine. The compressed gas stream is then passed through one or more gas expander stages 8, and optionally, at least one preheater stage 14 that heats the gas after expansion, where work is derived from the gas using a turbine during which electricity is produced.

Figure 2:
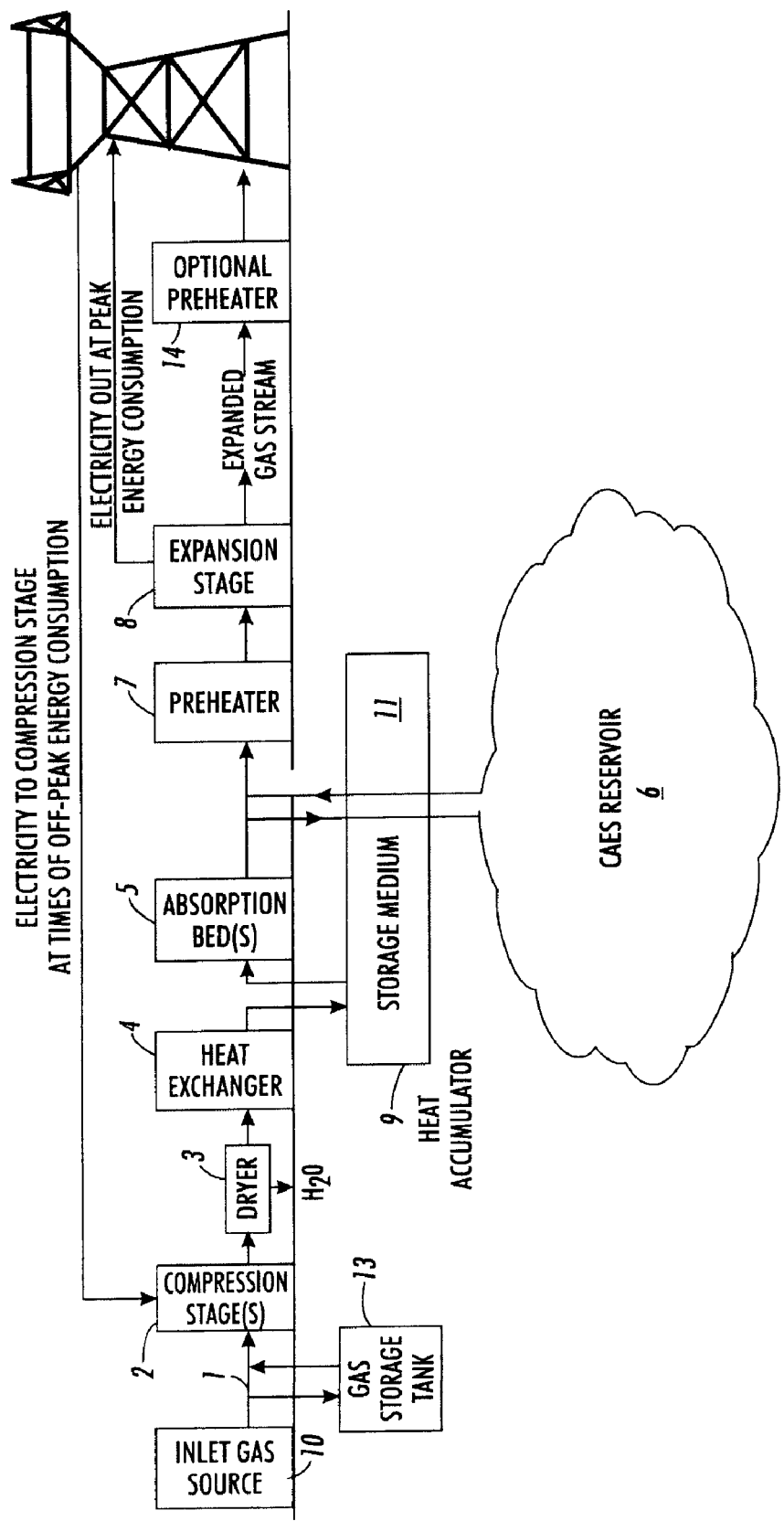
FIG. 2 is a modification of the embodiment of FIG. 1, which includes a heat accumulator, a dryer and a gas storage tank.

FIG. 2 shows an embodiment of the disclosure that is a modification of the embodiment shown in FIG. 1. The embodiment shown in FIG. 2, differs from that of FIG. 1 in that the embodiment also contains a dryer 3, a low pressure gas storage tank 13, and instead of simply having a heat exchanger 4, the embodiment has a heat transfer system consisting of a heat exchanger 4 combined with a heat accumulator 9.

In this embodiment, once the gas stream is compressed, the gas stream is fed through a dryer 3 where water that is condensed during compression is removed. The dryer 3 contains a desiccant. Specific examples of desiccant that can be used include activated alumina, silica gel, and molecular sieve zeolites. Upon leaving the dryer 3, the gas stream enters the heat exchanger 4 where excess heat is removed. The heat removed in the heat exchanger 4 can be stored in the heat accumulator 9 until it can be recycled within the CAES system. Inside the heat accumulator 9 there is a storage medium 11 such as rock, natural stone or artificially calcined and hardened stones. This embodiment may further have a gas storage tank 13. The gas storage tank 13 may be used to store inlet gas until it can be processed and stored in the CAES reservoir 6.

Figure 3:
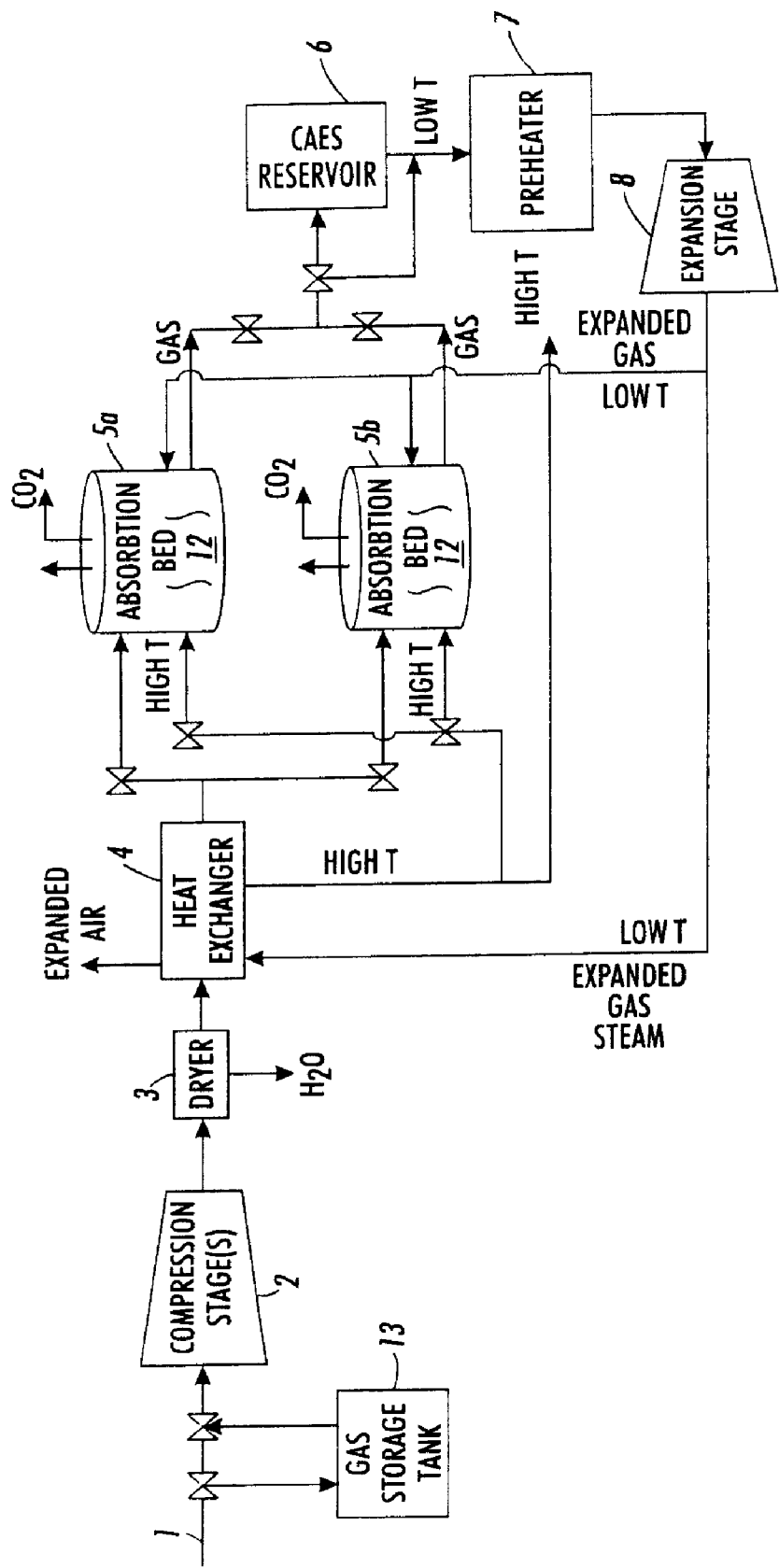
FIG. 3 is a block diagram illustrating a CAES system combined with a $CO_2$ capture system that illustrates recycling the heat that is removed in the heat exchanger

FIG. 3 shows an embodiment of the disclosure that recycles the heat that is removed in the heat exchanger 4. As shown in FIG. 3, a gas inlet 1, is connected to one or more compression stages 2. The compression stages 2 are connected to a dryer 3 used for removing condensed water from the gas stream. The compressed gas stream is then passed through a heat exchanger 4. The cooled gas stream is fed into one or more absorption beds 5a-b that contain an absorbent material 12. The absorbent material 12 can be any regenerable $CO_2$ absorbent. Specific examples of absorbent material 12 that can be used include monoethanolamine (MEA), diethanolamine (DEA), methyl-diethanolamine (MDEA), zeolites, molecular sieves and metal-organic frameworks. The absorption beds 5a-b are in parallel to each other so that some of them may be undergoing absorption while others are undergoing desorption. For example, the disclosure is illustrated in FIG. 3 with reference to two absorption beds. When absorption bed 5a is online it is undergoing absorption, while this is occurring absorption bed 5b is offline undergoing desorption. When the absorption bed 5b is undergoing desorption it is heated using heat extracted from the compressed gas stream by the heat exchanger 4. Heating the absorption bed 5a-b during desorption increases the rate at which $CO_2$ is desorbed. The desorbed $CO_2$ can be sequestered and used in a variety of industries or it can be converted to a hydrocarbon and used as fuel.

At times of off-peak energy consumption, the compressed gas stream is passed into a compressed gas reservoir 6 and stored at a pressure of from about 1000 psi to about 1500 psi until it is used to produce energy. When the compressed gas stream is needed, it is released from the compressed gas reservoir 6. At times of peak energy consumption, the compressed gas stream exiting the absorption bed 5a-b may bypass the compressed gas reservoir 6 and join the compressed gas stream that is being released from the compressed gas reservoir 6. Alternatively, at times of peak energy consumption, the inlet gas may be stored in the gas storage tank 13 and then at times of off peak energy consumption it can be fed into the compressor 2 and processed.

Once the compressed gas stream is released from the compressed gas reservoir 6, it is passed through a preheater 7 that heats the gas stream using heat previously extracted from the compressed gas stream by the heat exchanger 4. The compressed gas stream is then expanded through one or more gas expanders 8 that use a turbine to derive work from the expanding gas. The cool expanded gas can also be used to cool the compressed gas stream as it passes through the heat exchanger 4, or it may be used to cool the absorption beds 5a-5b when they are online undergoing absorption. Cooling the absorption bed 5a-b during absorption increases the amount of $CO_2$ that is absorbed onto the absorbent material 12.

Figure 4:
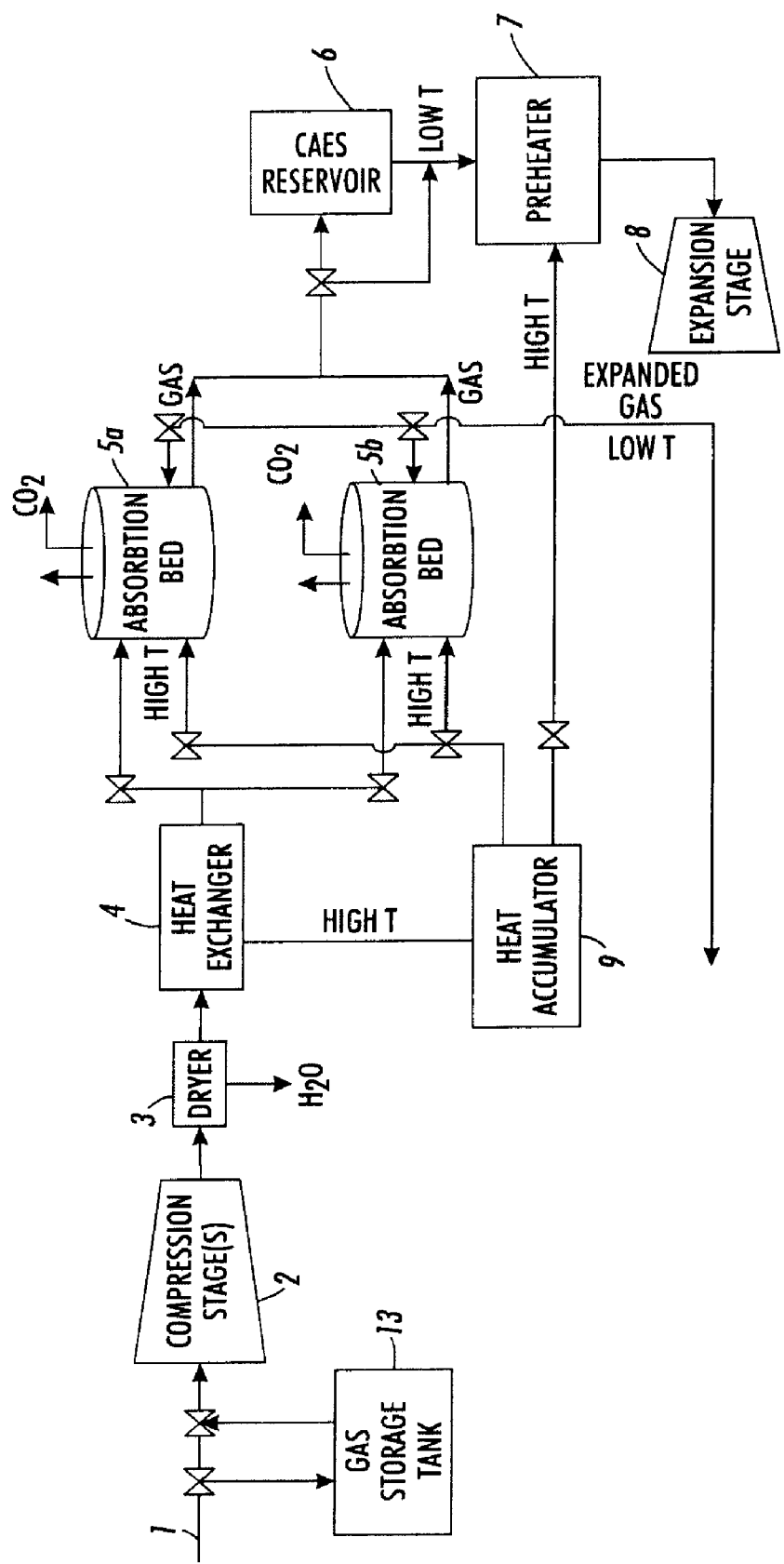
FIG. 4 is a modification of the embodiment of FIG. 3, which includes a heat accumulator.

FIG. 4 shows an embodiment of the disclosure that is a modification of the embodiment shown in FIG. 3. The embodiment shown in FIG. 4, differs from that of FIG. 3 primarily in that rather than simply having a heat exchanger 4, the embodiment has a heat transfer system consisting of a heat exchanger 4 combined with a heat accumulator 9. The heat accumulator 9 is used for storing the heat extracted from the compressed gas stream until it can be recycled and used in the preheater 7 to preheat the compressed gas stream prior to expansion. The recycled heat can also be used to heat the absorption beds 5a-b when they are offline undergoing desorption.

In another embodiment of the disclosure, there is provided a method for using a CAES system combined with a $CO_2$ capture system. In FIG. 1, the gas stream enters the system through the gas inlet pipe 1 and is compressed in at least one compression stage 2. Next, the compressed gas stream is cooled after each compression stage, and as shown in FIG. 2, the heat may be stored in a heat accumulator 9. Next, water that condenses out of the gas stream during compression may be separated from the compressed gas stream using the dryer 3. As shown in FIG. 3, the compressed gas stream is then fed into one or more absorption beds 5a-b where $CO_2$ is removed using the absorbent material 12. The compressed gas stream is stored in a compressed gas reservoir 6 until it is needed to produce electricity during times of peak energy consumption. To produce electricity the compressed gas is then preheated in the preheater 7 and fed through a gas expander 8 where work is derived from the gas using a turbine. The heat extracted during the compression of the gas stream is recycled to preheat the compressed gas before each expansion stage and to heat the absorption beds 5a-b during desorption. The expanded gas may also be used to cool the absorption beds 5a-b during $CO_2$ absorption and to extract heat from the compressed gas stream after compression.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A compressed air energy storage system comprising: a gas inlet pipe;
   at least one air compressor stage attached to and located downstream from the gas inlet pipe, the at least one air compressor stage being adapted for compression of a gas;
   a heat transfer system linked to and located downstream from the at least one air compressor stage;
   at least one absorption bed linked to and located directly downstream from the heat transfer system;
   at least one compressed gas reservoir having an inlet and an outlet, the inlet of the compressed gas reservoir being attached to an outlet of the absorption bed;
   at least one preheater that is attached to the outlet of the compressed gas reservoir, the at least one preheater adapted to heat a compressed gas before expansion but after storage in the compressed gas reservoir; and
   at least one gas expander that is linked to and located directly downstream from the at least one preheater and is adapted for the expansion of the compressed gas,
   wherein the heat transfer system being adapted (1) to remove at least a portion of heat from the gas during or after compression and (2) to recycle at least a portion of the removed heat to heat the at least one absorption bed, and/or to preheat a compressed gas prior to expansion with the removed heat, and/or to heat the expanded gas after each stage of expansion with the removed heat.

2. The compressed air energy system according to claim 1, wherein the gas inlet pipe is attached to the exhaust stream of an oil fired power plant or a coal fired power plant or a gas turbine power plant.

3. The compressed air energy system according to claim 1, further comprising a gas storage tank, wherein the gas storage tank is attached to the gas inlet pipe.

4. The compressed air energy system according to claim 1, further comprising a dryer, wherein the inlet of the dryer is attached to and located directly downstream from the outlet of the at least one air compressor stage and the outlet of the dryer is attached to and located directly upstream from the heat transfer system, wherein the dryer contains a desiccant selected from the group consisting of activated alumina, silica gel and molecular sieve zeolites.

5. The compressed air energy storage system of claim 1, wherein the heat transfer system comprises at least one heat exchanger that cools the gas during compression and heats the gas during expansion.

6. The compressed air energy system according to claim 1, wherein the heat transfer system further comprises:
at least one heat accumulator for storing heat removed from the compressed gas.

7. The compressed air energy system according to claim 1, wherein the at least one absorption bed is a pressure swing absorption bed, a temperature swing absorption bed, or a pressure and temperature swing absorption bed.

8. The compressed air energy system according to claim 1, wherein the at least one absorption bed contains a $CO_2$ absorbent selected from the group consisting of monoethanolamine, diethanolamine, methyl-diethanolamine, zeolites, molecular sieves and metal-organic frameworks.

9. The compressed air energy system according to claim 1, further comprising a storage reservoir or processing apparatus linked to and located directly downstream from the at least one absorption bed for the component absorbed from the gas.

10. The compressed air energy system according to claim 1, wherein the compressed gas reservoir is selected from a group consisting of a cavern, a cave, an aquifer, a mine, and other geologic formations.

11. The compressed air energy system according to claim 1, wherein the gas expander comprises a turbine.

12. The compressed air energy system according to claim 11, wherein the at least one preheater comprises:
at least one heat exchanger for heating the compressed gas prior to entering the turbine, and for using the expanded gas to cool the at least one absorption bed.

13. A method of capturing $CO_2$ during compressed air energy storage, comprising:
compressing a gas in at least one compression stage;
removing at least a portion of heat from a compressed gas during or after the at least one compression stage;
separating $CO_2$ from the compressed gas using an absorption bed after the removal of heat through a heat transfer system linked to and located downstream from the at least one compression stage;
storing the compressed gas in a compressed gas reservoir after separating $CO_2$ from the compressed gas;
subsequently removing the stored gas from the compressed gas reservoir and then expanding the compressed gas while deriving work from the gas;
preheating the compressed gas prior to expansion by feeding the compressed gas through at least one heat exchanger; and
recycling at least a portion of the removed heat from the heat transfer system to preheat the compressed gas prior to expansion, and/or to heat the expanded gas after each stage of expansion with the removed heat, and/or to heat the absorption bed with the removed heat.

14. The method of capturing $CO_2$ during compressed air energy storage according to claim 13, wherein the heat removed from the compressed gas is stored in a heat accumulator.

15. The method of capturing $CO_2$ during compressed air energy storage according to claim 13, further comprising separating condensed water from the compressed gas after cooling the gas; wherein the condensed water is removed using a dryer.

16. The method of capturing $CO_2$ during compressed air energy storage according to claim 13, wherein the $CO_2$ is separated using a pressure swing absorption bed, a temperature swing absorption bed, or a pressure and temperature swing absorption bed.

17. The method of capturing $CO_2$ during compressed air energy storage according to claim 13, further comprising desorbing the $CO_2$ from the absorption bed, and storing or further processing the desorbed $CO_2$.

18. The method of capturing $CO_2$ during compressed air energy storage according to claim 13, wherein the compressed gas is expanded using a turbine.

19. The method of capturing $CO_2$ during compressed air energy storage of claim 13, wherein the expanded gas is used to cool the absorption bed during $CO_2$ absorption and to extract heat from the compressed gas stream after compression.

* * * * *